US012277551B2

United States Patent
Patel et al.

(10) Patent No.: US 12,277,551 B2
(45) Date of Patent: Apr. 15, 2025

(54) RESOURCE TRANSFER VALIDATION WITHIN A METAVERSE

(71) Applicant: Bank of America Corporation, Charlotte, NC (US)

(72) Inventors: Vinesh Premji Patel, London (GB); Manu J. Kurian, Dallas, TX (US); Michael Robert Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 316 days.

(21) Appl. No.: 17/729,982

(22) Filed: Apr. 26, 2022

(65) Prior Publication Data

US 2023/0342760 A1    Oct. 26, 2023

(51) Int. Cl.
*G06Q 20/38* (2012.01)
*G06Q 20/06* (2012.01)
*G06Q 20/40* (2012.01)

(52) U.S. Cl.
CPC ....... *G06Q 20/3825* (2013.01); *G06Q 20/065* (2013.01); *G06Q 20/3827* (2013.01); *G06Q 20/4014* (2013.01)

(58) Field of Classification Search
CPC ............ G06Q 20/3825; G06Q 20/065; G06Q 20/3827; G06Q 20/4014; G06Q 20/3821; G06Q 20/385; G06Q 20/4015; G06F 21/335; H04L 9/3234; H04L 9/50; H04L 63/123
See application file for complete search history.

(56) References Cited

U.S. PATENT DOCUMENTS

| | | | |
|---|---|---|---|
| 6,898,609 B2 | 5/2005 | Kerwin | |
| 7,240,073 B2 | 7/2007 | Benson et al. | |
| 7,620,658 B2 | 11/2009 | Benson et al. | |
| 7,690,997 B2 | 4/2010 | Van Luchene et al. | |
| 7,775,885 B2 | 8/2010 | Van Luchene et al. | |
| 7,991,706 B2 | 8/2011 | Mattern | |
| 8,063,929 B2 | 11/2011 | Kurtz et al. | |
| 8,070,596 B2 | 12/2011 | Van Luchene | |

(Continued)

OTHER PUBLICATIONS

Kelly, Shane. "Money Laundering Through Virtual Worlds of Video Games: Recommendations for a New Approach to AML Regulation." Syracuse L. Rev. 71 (2021): 1485. (Year: 2021).*

(Continued)

*Primary Examiner* — Florian M Zeender
*Assistant Examiner* — Kimberly S. Bursum

(57) ABSTRACT

A device is configured to receive an interaction request from the first user that identifies an address for a contract that is stored in a blockchain and to access machine-executable instructions associated with the contract. The device is further configured to determine a projected number of virtual resources and real-world resources for the first user based on a number of available resources for the first user and the machine-executable instructions for transferring resources between the first user and the second user in the contract. The device is further configured to output the projected number of virtual resources to the first user and to output the projected number of real-world resources to the first user. The device is further configured to initiate a transfer of resources between the first user and the second user.

20 Claims, 8 Drawing Sheets

(56) References Cited

U.S. PATENT DOCUMENTS

| | | |
|---|---|---|
| 8,112,490 B2 | 2/2012 | Upton et al. |
| 8,140,340 B2 | 3/2012 | Bhogal et al. |
| 8,154,578 B2 | 4/2012 | Kurtz et al. |
| 8,154,583 B2 | 4/2012 | Kurtz et al. |
| 8,159,519 B2 | 4/2012 | Kurtz et al. |
| 8,165,991 B2 | 4/2012 | Richards Jones et al. |
| 8,230,045 B2 | 7/2012 | Kawachiya et al. |
| 8,237,771 B2 | 8/2012 | Kurtz et al. |
| 8,245,241 B2 | 8/2012 | Hamilton et al. |
| 8,245,283 B2 | 8/2012 | Dawson et al. |
| 8,253,770 B2 | 8/2012 | Kurtz et al. |
| 8,274,544 B2 | 9/2012 | Kurtz et al. |
| 8,454,431 B2 | 6/2013 | Van Luchene |
| 8,578,285 B2 | 11/2013 | Wetzer et al. |
| 8,608,536 B2 | 12/2013 | Van Luchene et al. |
| 8,751,948 B2 | 6/2014 | Wetzer et al. |
| 8,769,600 B2 | 7/2014 | Relyea et al. |
| 9,026,796 B2 | 5/2015 | Dettinger et al. |
| 9,250,702 B2 | 2/2016 | Clark et al. |
| 9,875,580 B2 | 1/2018 | Cannon et al. |
| 9,895,612 B2 | 2/2018 | Pacey et al. |
| 10,242,032 B2 | 3/2019 | Sundaresan et al. |
| 10,373,129 B1 | 8/2019 | James et al. |
| 10,373,158 B1 | 8/2019 | James et al. |
| 10,438,290 B1 | 10/2019 | Winklevoss et al. |
| 10,486,365 B2 | 11/2019 | Kaltenbach et al. |
| 10,540,653 B1 | 1/2020 | James et al. |
| 10,540,654 B1 | 1/2020 | James et al. |
| 10,639,551 B2 | 5/2020 | Hamilton, II et al. |
| 10,915,891 B1 | 2/2021 | Winklevoss et al. |
| 10,917,445 B2 | 2/2021 | Andon et al. |
| 10,929,842 B1 | 2/2021 | Arvanaghi et al. |
| 11,017,391 B1 | 5/2021 | Winklevoss et al. |
| 11,139,955 B1 | 10/2021 | So et al. |
| 11,200,569 B1 | 12/2021 | James et al. |
| 11,235,530 B2 | 2/2022 | Kaltenbach et al. |
| 11,282,139 B1 | 3/2022 | Winklevoss et al. |
| 11,443,368 B2* | 9/2022 | Wang ................ G06F 21/6245 |
| 11,551,274 B2* | 1/2023 | Williams ............ G06Q 40/12 |
| 12,113,789 B2 | 10/2024 | Patel et al. |
| 2004/0225632 A1 | 11/2004 | Benson et al. |
| 2005/0027713 A1 | 2/2005 | Cameron et al. |
| 2007/0117615 A1* | 5/2007 | Van Luchene ......... A63F 13/35 |
| | | 463/25 |
| 2007/0218986 A1 | 9/2007 | Van Luchene et al. |
| 2007/0219001 A1 | 9/2007 | Mueller et al. |
| 2008/0026847 A1 | 1/2008 | Mueller et al. |
| 2008/0090628 A1 | 4/2008 | Mueller et al. |
| 2008/0147354 A1 | 6/2008 | Rowan et al. |
| 2008/0147424 A1 | 6/2008 | Rowan et al. |
| 2008/0200253 A1 | 8/2008 | Van Luchene et al. |
| 2008/0303811 A1 | 12/2008 | Van Luchene |
| 2009/0083322 A1 | 3/2009 | Relyea et al. |
| 2009/0158150 A1 | 6/2009 | Lyle et al. |
| 2009/0165021 A1 | 6/2009 | Pinkston et al. |
| 2009/0170604 A1 | 7/2009 | Mueller et al. |
| 2010/0053187 A1* | 3/2010 | Arrasvuori .............. A63F 13/30 |
| | | 345/581 |
| 2010/0088650 A1 | 4/2010 | Kaltenbach et al. |
| 2010/0150353 A1 | 6/2010 | Bauchot et al. |
| 2010/0153722 A1 | 6/2010 | Bauchot et al. |
| 2010/0269053 A1 | 10/2010 | Lingafelt et al. |
| 2011/0231434 A1 | 9/2011 | Tabata et al. |
| 2012/0158473 A1 | 6/2012 | Cox et al. |
| 2014/0281850 A1 | 9/2014 | Prakash et al. |
| 2015/0143487 A1* | 5/2015 | Nathan ................ H04L 63/08 |
| | | 726/6 |
| 2015/0309814 A1 | 10/2015 | Jee et al. |
| 2017/0165578 A1 | 6/2017 | Hamilton, II et al. |
| 2017/0259167 A1 | 9/2017 | Cook et al. |
| 2018/0268382 A1* | 9/2018 | Wasserman .......... H04L 9/3247 |
| 2019/0370492 A1 | 12/2019 | Falchuk et al. |
| 2020/0174563 A1 | 6/2020 | Peters |
| 2021/0056750 A1 | 2/2021 | Rowley |
| 2021/0166223 A1* | 6/2021 | Moiyallah, Jr. ...... G06Q 20/389 |
| 2021/0357447 A1 | 11/2021 | McKenzie |
| 2022/0051180 A1 | 2/2022 | Altieri |
| 2022/0060572 A1 | 2/2022 | Kwon |
| 2022/0080319 A1 | 3/2022 | Lee |
| 2023/0344634 A1 | 10/2023 | Patel et al. |
| 2023/0360007 A1* | 11/2023 | Krishnaswamy .... G06Q 20/389 |

OTHER PUBLICATIONS

Artimetrics: Biometrics for Artificial Entities By Roman V. Yampolskiy and Marina L. Gavrilova Published Dec. 2012 (Year: 2012).*

Guna, JoÅ3/4e, et al. "User identification approach based on simple gestures." Multimedia tools and applications 71 (2014): 179-194. (Year: 2014).*

Sae-Bae, Napa, et al. "Multitouch gesture-based authentication." IEEE transactions on information forensics and security 9.4 (2014): 568-582. (Year: 2014).*

* cited by examiner

RESOURCE TRANSFER VALIDATION WITHIN A METAVERSE

TECHNICAL FIELD

The present disclosure relates generally to information security, and more specifically to resource transfer validation within a metaverse.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a network attack until after the attack has occurred. For example, a bad actor may connect to a user device within a network environment which then allows the bad actor to gain unauthorized access to information that is stored in the user device. The bad actor may also perform other malicious activities such as spoofing or pretending to be another user to gain access to other users' information.

SUMMARY

The disclosed system provides several practical applications and technical advantages that overcome the previously discussed technical problems. The following disclosure provides a practical application of a server that is configured as an information security device for a computer system. The disclosed information security device provides practical applications that improve the information security of the computer system by using multifactor authentication that relies on a combination of factors from both a user in the real world and an avatar that is associated with the user in a virtual environment, such as in the metaverse. This process provides a technical advantage that increases information security because it requires a bad actor to simultaneously spoof a user both in the real world and in a virtual environment in order to pass authentication. This combination of factors increases the complexity that is associated with spoofing a user to gain access to their personal information and/or to perform malicious activities on other users within a virtual environment. This process may be employed to authenticate and validate the identity of a user before allowing the user to perform any kind of action or interaction within a virtual environment. In addition, this process provides information security to the overall computer system since it prevents bad actors from spoofing users within a virtual environment. Improving information security for the computer system also improves the underlying network and the devices within the network. For example, when a data exfiltration attack occurs, there is an increase in the number of network resources and bandwidth that are consumed which reduces the throughput of the network. By preventing data exfiltration attacks, the computer system can prevent any unnecessary increases in the number of network resources and bandwidth that are consumed that would otherwise negatively impact the throughput of the computer system. Thus, the disclosed processes improve the operation of the computer system overall.

In one embodiment, the computer system comprises a device that is configured to identify a physical location within a virtual environment for an avatar that is associated with a user and to obtain a first token from a token map based on the physical location within the virtual environment for the avatar that is associated with the user. The device is further configured to receive physical attribute information for the user in the real world and to obtain a second token from the token map based on the physical attribute information for the user in the real world. The device is further configured to generate an authentication token by combining the first token and the second token and to output the authentication token.

In another embodiment, the computer system comprises a device that is configured to receive a user input from a user device indicating a first gesture performed by a user in a real-world environment and to identify a first token within a gesture map corresponding with the first gesture. The device is further configured to identify a second gesture performed by an avatar within a virtual environment that is associated with the user and to identify a second token within the gesture map corresponding with the second gesture. The device is further configured to combine the first token and the second token to generate an authentication token and to output the authentication token.

In another embodiment, the computer system comprises a device that is configured to receive an interaction request from the first user that identifies an address for a contract that is stored in a blockchain and to access machine-executable instructions associated with the contract. The device is further configured to determine a projected number of virtual resources and real-world resources for the first user based on a number of available resources for the first user and the machine-executable instructions for transferring resources between the first user and the second user in the contract. The device is further configured to output the projected number of virtual resources to the first user and to output the projected number of real-world resources to the first user.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Computer System Overview

Figure 1:
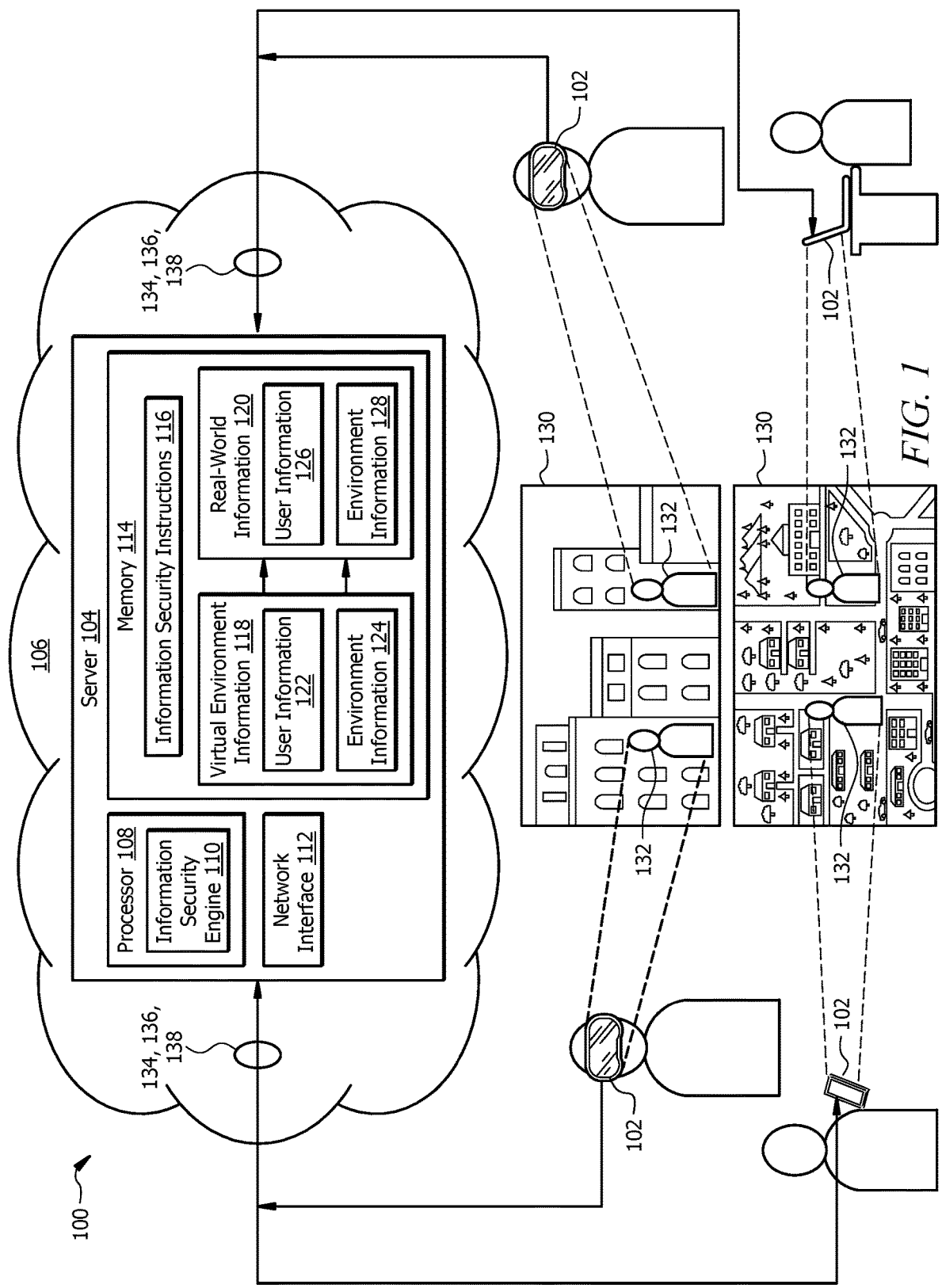
FIG. 1 is a schematic diagram for a computer system configured to provide information security to a virtual environment.

FIG. 1 is a schematic diagram of an embodiment of a computer system 100 that is generally configured to provide information security to users within a virtual environment 130. For example, the computer system 100 may be configured to perform multifactor authentication that uses a combination of factors from both the real world and a virtual environment 130. This process may be employed to authenticate a user before allowing the user to perform any kind of action or interaction within the virtual environment 130. This process provides improved information security because it relies on a combination of factors that are associated with both the user in the real world and an avatar 132 that is associated with the user in a virtual environment 130.

The computer system 100 may also be configured to perform a gesture-based multifactor authentication that uses a combination of gestures from both the real world and a virtual environment 130. This process may also be employed to authenticate a user before allowing the user to perform any kind of action or interaction within the virtual environment 130. This process provides improved information security because it relies on a combination of gestures that are performed by a user in the real world as well as an avatar 132 that is associated with the user in a virtual environment 130.

The computer system 100 may also be configured to use a contract 808 that is stored in a blockchain 712 to transfer real-world resources and/or virtual resources between users within a virtual environment 130. This process also allows the users to preview the effect of a transfer of real-world resources and virtual resources by determining and outputting the projected number of real-world resources and virtual resources before initiating an actual transfer of the resources between the users.

In one embodiment, the computer system 100 comprises one or more user devices 102 and a server 104. The user devices 102 and the server 104 are in signal communication with each other within a network 106. The network 106 allows communication between and amongst the various components of the computer system 100. This disclosure contemplates the network 106 being any suitable network operable to facilitate communication between the components of the computer system 100. The network 106 may include any interconnecting system capable of transmitting audio, video, signals, data, messages, or any combination of the preceding. The network 106 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

User Devices

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IoT) device, or any other suitable type of device. The user device 102 may comprise a graphical user interface (e.g. a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. For example, some virtual environments 130 may be configured to use gravity whereas other virtual environments 130 may not be configured to use gravity. Within the virtual environment 130, each user may be associated with an avatar 132. An avatar 132 is a graphical representation of the user within the virtual environment 130. Examples of avatars 132 include, but are not limited to, a person, an animal, or an object. In some embodiments, the features and characteristics of the avatar 132 may be customizable and user-defined. For example, the size, shape, color, attire, accessories, or any other suitable type of appearance features may be specified by a user. By using an avatar 132, a user is able to move within the virtual environment 130 to interact with other avatars 132 and objects within the virtual environment 130.

Each user device 102 is further configured to allow a user to send requests to the server 104. For example, a user may use a user device 102 to send an authentication request 134 that requests an authentication token 136 that can be used for authenticating the user with another user. An example of this process is described in more detail below in FIGS. 2-5. As another example, a user may use a user device 102 to send an interaction request 138 that requests a transfer of real-world resources and/or virtual resources between the user and another user. An example of this process is described in more detail below in FIGS. 6 and 7.

Server

The server 104 is a hardware device that is generally configured to provide services and software and/or hardware resources to user devices 102. Examples of a server 104 include, but are not limited to, a computer, a database, or any other suitable type of network device. In one embodiment, a server 104 comprises a processor 108, a network interface 112, and a memory 114.

Processor

The processor 108 is a hardware device that comprises one or more processors operably coupled to the memory 114. The processor 108 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute information security instructions 116 to implement the information security engine 110. In this way, processor 108 may be a special-purpose computer designed to implement the functions disclosed herein. In an embodiment, the information security engine 110 is implemented using logic units, FPGAs, ASICs, DSPs, or any other suitable hardware. The information security engine 110 is configured to operate as described in FIGS. 2-7. The information security engine 110 may be configured to perform the operations of processes 200, 400, and 600 as described in FIGS. 2, 4, and 6, respectively. For example, the information security engine 110 may be configured to provide multifactor authentication within a real-world environment and a virtual environment 130 to generate authentication tokens 136 for a user to use within the virtual environment 130. An example of this process is described in FIGS. 2 and 3. As another example, the information security engine 110 may be configured to provide gesture-based authentication to generate authentication tokens 136 for a user to use within a virtual environment 130. An example of this process is described in FIGS. 4 and 5. As another example, the information security engine 110 may be configured to facilitate real-world resource and/or virtual resource transfers between users within a virtual environment 130. An example of this process is described in FIGS. 6 and 7.

Memory

The memory 114 is a hardware device that is operable to store any of the information described above with respect to FIGS. 1-8 along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security instructions 116, virtual environment information 118, real-world information 120, and/or any other data or instructions. The information security instructions 116 may comprise any suitable set of instructions, logic, rules, or code operable to execute the information security engine 110. The virtual environment information 118 comprises user information 122 and environment information 124. The user information 122 generally comprises information that is associated with any accounts that can be used within a virtual environment 130. For example, user information 122 may comprise user profile information, online account information, avatar information, digital assets information, or any other suitable type of information that is associated with a user within a virtual environment 130. The environment information 124 generally comprises information about the appearance of a virtual environment 130. For example, the environment information 124 may comprise information associated with objects, landmarks, buildings, structures, avatars, or any other suitable type of element that is present within a virtual environment 130. In some embodiments, the environment information 124 may be used to create a representation of a virtual environment 130 for users. In this case, a virtual environment 130 may be implemented using any suitable type of software framework or engine.

The real-world information 120 comprises user information 126 and environment information 128. The user information 126 generally comprises information that is associated with any accounts that can be used within the real world. For example, user information 126 may comprise user profile information, account information, or any other suitable type of information that is associated with a user within a real-world environment. The environment information 128 generally comprises information that is associated with an entity within the real world that the user is a member of or is associated with. For example, the environment information 128 may comprise addresses, phone numbers, email addresses, contact names, or any other suitable type of information that is associated with an entity. Since the server 104 has access to both the virtual environment information 118 and the real-world information 120, the server 104 is able to link together the virtual environment information 118 and the real-world information 120 for a user such that changes to the virtual environment information 118 affect or propagate to the real-world information 120 and vice-versa. For example, the server 104 may be configured to store one or more maps (e.g. token map 302 and gesture map 502) that translate or convert different types of interactions between the real world and the virtual environment 130 and vice-versa.

Network Interface

The network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Authentication Process for a Virtual Environment

Figure 2:
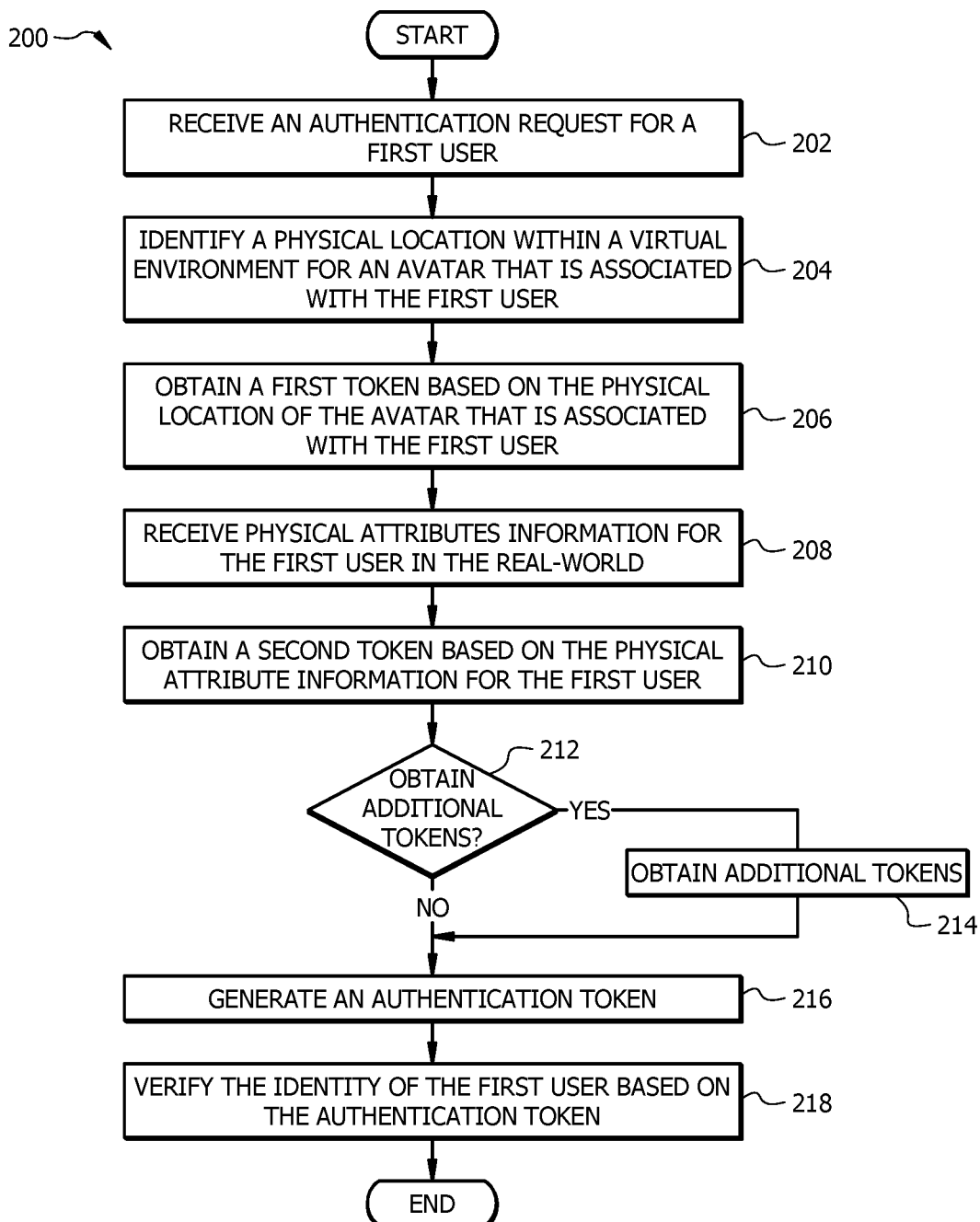
FIG. 2 is a flowchart of an embodiment of an authentication process for the virtual environment.
Figure 3:
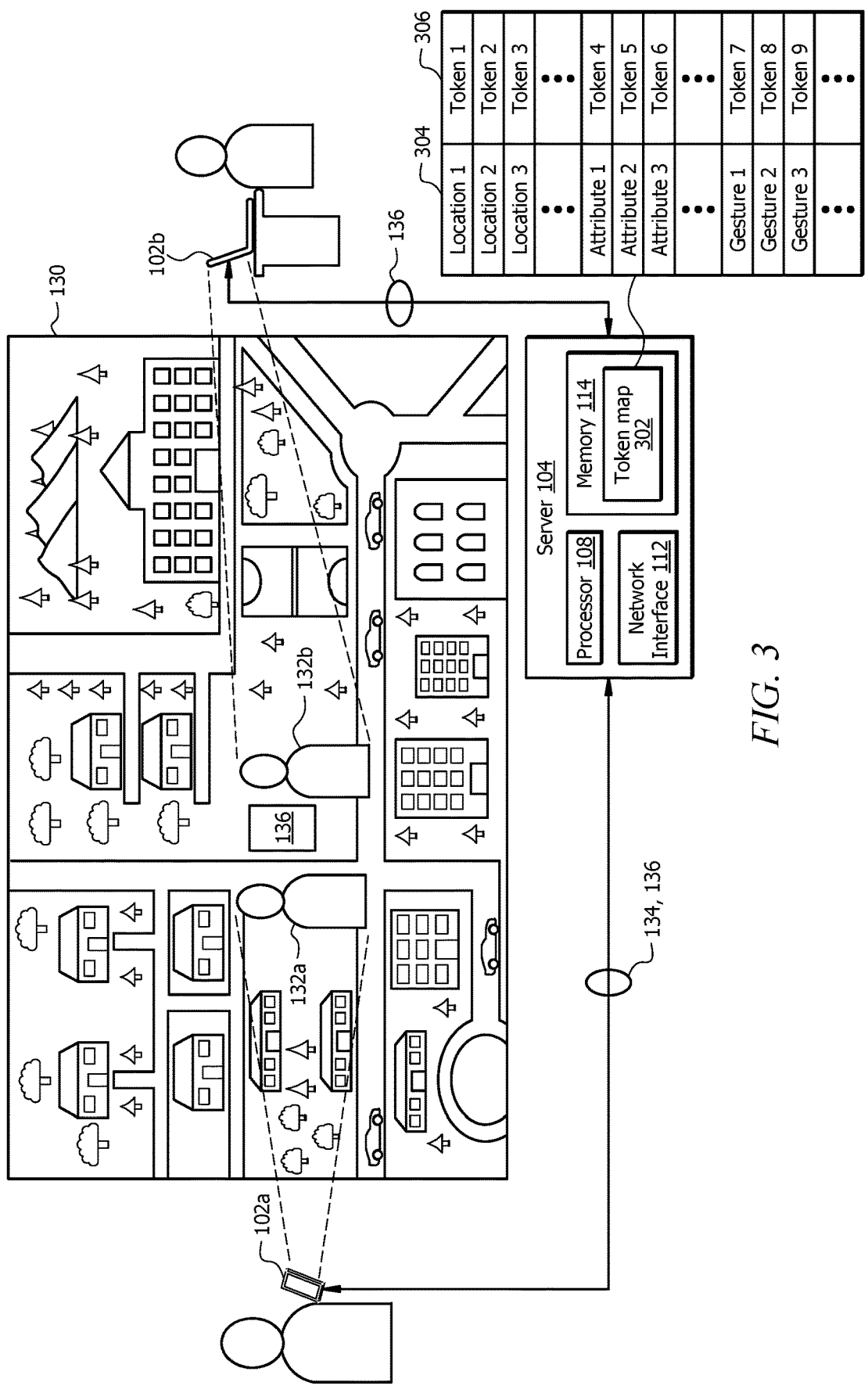
FIG. 3 is an example of users authenticating themselves within a virtual environment.

FIG. 2 is a flowchart of an embodiment of an authentication process 200 for a virtual environment 130. The computer system 100 may employ process 200 to perform multifactor authentication that uses a combination of factors from both the real world and a virtual environment 130. Process 200 may be employed to authenticate a user before allowing the user to perform any kind of action or interaction within a virtual environment 130. Process 200 provides improved information security because it relies on a combination of factors that are associated with both the user in the real world and an avatar 132 that is associated with the user in a virtual environment 130.

At operation 202, the server 104 receives an authentication request 134 for a user. Referring to the example in FIG. 3, a first user may use their avatar 132a to interact with a second user's avatar 132b. In this example, the second user may request an authentication token 136 from the first user that can be used to verify the identity of the first user and/or to authenticate the first user before interacting with the first user. In this case, the first user may use their user device 102a to generate an authentication request 134 to request an authentication token 136 that can be provided to the second user. In this example, the first user may use an application within their user device 102a to generate the authentication request 134 and to send the authentication request 134 to the server 104. The user device 102a may use any suitable messaging or communication technique to transmit the authentication request 134 to the server 104. The authentication request 134 may comprise a user identifier (e.g. a name or alphanumeric code) that identifies the user requesting the authentication token 136. In this particular example, the authentication request 134 includes a user identifier that identifies the first user seeking to be verified by the second user. In other examples, the second user may generate an authentication request 134 using a user device 102b, wherein that authentication request include a user identifier that identifies the second user seeking to be verified, such as by the first user. In some embodiments, the authentication request 134 may further comprise any other suitable type of information that is associated with the first user and/or the second user. In some embodiments, the authentication request 134 may also identify a number and/or types of tokens 306 that are required for generating an authentication token 136. After receiving the authentication request 134, the server 104 begins collecting information associated with the user and/or their avatar 132 within the virtual environment 130 as part of a multifactor authentication process for generating an authentication token 306.

Returning to FIG. 2 at operation 204, the server 104 identifies a physical location within a virtual environment 130 for the avatar 132a that is associated with the first user. Here, the server 104 determines where the first user's avatar 132a is currently located within the virtual environment 130. In some embodiments, the physical location may be an absolute location within the virtual environment 130. For example, the physical location may be a coordinate within the virtual environment 130, a pixel location within the virtual environment 130, or an address of a landmark (e.g. a structure, building, intersection, etc.) within the virtual environment 130. In other embodiments, the physical location may be a relative location within the virtual environment 130. For example, the physical location may reference one or more landmarks within a predetermined distance of the first user's avatar 132a.

At operation 206, the server 104 obtains a first token 306 based on the physical location of the avatar 132a that is associated with the first user. Returning to the example in FIG. 3, the server 104 is configured to store a token map 302. The token map 302 is generally configured to map different types of action and attribute elements 304 to tokens 306. Each token 306 is a unique alphanumeric value that can be used as authentication token 136 or combined with one or more other tokens 306 to form an authentication token 136. In the example shown in FIG. 3, the token map 302 is configured to map physical locations within the virtual environment 130, physical attributes information for the first user, and gestures to tokens 306. In this example, the physical locations identify locations within the virtual environment 130. The physical attributes information identifies the attributes of the first user. For example, the physical attributes information may comprise biometric signals for the first user. Examples of biometric signals include, but are not limited to, fingerprint scans, eye or retina scans, images of the first user or their face, and voice sample recordings. The gestures may correspond with gestures performed by the first user within the real world and/or gestures performed by their avatar 132a within the virtual environment 130. In other examples, the token map 302 may be configured to map any other suitable type and combination of elements 304 to tokens 306. After identifying the physical location of the avatar 132a that is associated with the first user, the server 104 may use the identified physical location as a search token to identify a corresponding or closest matching token 306 in the token map 302.

Returning to FIG. 2 at operation 208, the server 104 receives physical attributes information for the first user in the real world. Here, the server 104 obtains physical attributes information that identifies one or more attributes of the user. For example, the server 104 may receive a fingerprint scan, an eye or retina scan, an image of the first user or their face, and/or a voice sample recording from the first user.

At operation 210, the server 104 obtains a second token 306 based on the physical attributes information for the first user. After receiving the physical attributes information for the first user, the server 104 may use the physical attributes information as a search token to identify a corresponding or closest matching token 306 in the token map 302.

At operation 212, the server 104 determines whether to obtain additional tokens 306 for authenticating the first user. In embodiments where the authentication request 134 identifies a number and/or types of tokens 306 that are required for generating an authentication token 136. The server 104 determines whether the appropriate number and types of tokens 306 have been obtained for the first user based on the authentication request 134. In this example, the server 104 determines to obtain additional tokens 306 in response to determining that one or more tokens 306 identified by the authentication request 134 have not been obtained for the first user. Otherwise, the server 104 determines not to obtain additional tokens 306 in response to determining that the appropriate number and types of tokens 306 have been obtained for the first user based on the authentication request 134.

The server 104 proceeds to operation 214 in response to determining to obtain additional tokens 306 for authenticating the first user. In this case, the server 104 proceeds to operation 214 to obtain any missing tokens 306. At operation 214, the server 104 obtains additional tokens 306 for authenticating the first user. As an example, the server 104 may identify gestures performed by the avatar 132a that is associated with the first user within the virtual environment 130. For instance, the first user may trigger the avatar 132a to perform one or more specific actions (e.g. jump, crouch, wave, etc.) and/or to move to a predetermined location within the virtual environment 130. In this example, the server 104 uses the identified gesture for the avatar 132a as a search token to identify a corresponding or closest matching token 306 in the token map 302. As another example, the server 104 may identify gestures performed by the first user in the real world. For instance, the first user may perform a facial expression, perform a hand gesture, provide a voice command, or perform any other suitable type of gesture in the real world. In this example, the server 104 uses the identified gesture for the first user as a search token to identify a corresponding or closest matching token 306 in the token map 302. In other examples, the server 104 may identify any other suitable number of tokens 306 based on information associated with the first user and/or the avatar 132a that is associated with the first user.

Returning to operation 212, the server 104 proceeds to operation 216 in response to determining not to obtain additional tokens 306 for authenticating the first user. In this case, the server 104 proceeds to operation 216 to generate an authentication token 136. At operation 216, the server 104 generates an authentication token 136 based on the obtained tokens 306 for the first user. In one embodiment, the server 104 may generate an authentication token 136 by concatenating the obtained tokens 306 with each other to form a string of tokens 306 that corresponds with the authentication token 136. In other embodiments, the server 104 may generate an authentication token 136 by performing one or more operations on the obtained tokens 306. For example, the server 104 may perform a hashing operation on two or more of the obtained tokens 306. The result of the hashing operations may serve as the authentication token 136. In other examples, the server 104 may perform any other suitable type of operation on the obtained tokens 306 to generate an authentication token 136.

At operation 218, the server 104 verifies the identify of the first user based on the authentication token 136. In one embodiment, the server 104 may verify the identity of the first user using the authentication token 136 by sending the authentication token 136 to the user device 102 of the first user that sent the authentication request 134. In this case, the first user may use their user device 102a to provide the authentication token 136 to the second user. For example, the first user may generate a graphical representation of the authentication token 136 that can be displayed to the second user within the virtual environment 130. Examples of graphical representations include, but are not limited to, images, barcodes, alphanumeric text, objects, or any other suitable type of representation. In this example, the graphical representation of the authentication token 136 allows the second user to visually confirm the identify of the first user. For example, the second user may compare the graphical representation of the authentication token 136 to an expected or predefined graphical representation of an authentication token 136. In this example, the second user may have the expected or predefined representation of the authentication token 136 stored in memory within their user device 102b so that it can be retrieved to verify the identify of the first user. The second user verifies the identify of the first user when the graphical representation of the authentication token 136 that is provided by the first user matches the expected or predefined graphical representation of the authentication token 136. For example, the second user may use their user device 102b to perform an image analysis on the graphical representation of the authentication token 136 that is provided by the first user and the expected or predefined graphical representation of the authentication token 136 to determine whether the two graphical representations are the same. The second user may employ any suitable type of image process algorithm or technique to compare the two graphical representations of the authentication token 136.

In other embodiments, the server 104 may verify the identify of the first user using the authentication token 136 by sending the authentication token 136 to the user device 102b of the second user. For example, the authentication request 134 may identify the second user and/or the user device 102b that is intended to receive the authentication token 136. In this case, the server 104 sends the authentication token 136 to the second user or their user device 102b. The second user may then use the received authentication token 136 to authenticate or validate the identity of the first user. For example, the second user may compare the alphanumeric string of the received authentication token 136 for the first user to an alphanumeric string from an expected or predefined authentication token 136 for the first user. The second user verifies the identify of the first user when the alphanumeric string of the received authentication token 136 for first user is the same as the alphanumeric string of the expected or predefined authentication token 136 for the first user. In some embodiments, the second user verifies the identify of the first user when the alphanumeric string of the received authentication token 136 for first user is within a predetermined threshold value of the alphanumeric string of the expected or predefined authentication token 136 for the first user.

In other embodiments, the server 104 may verify the identify of the first user by outputting a message to the second user that indicates whether the identify of the first user has been verified. For example, the server 104 may compare the alphanumeric string of the authentication token 136 for the first user to an alphanumeric string of an expected or predefined authentication token 136 for the first user. The server 104 verifies the identify of the first user when the alphanumeric string of the authentication token 136 for first user is the same as the alphanumeric string of the expected or predefined authentication token 136 for the first user. In some embodiments, the second user verifies the identify of the first user when the alphanumeric string of the received authentication token 136 for first user is within a predetermined threshold value of the alphanumeric string of the expected or predefined authentication token 136 for the first user. In response to determining that the identity of the first user has been verified, the server 104 may send a message to the user device 102b of the second user that indicates that the identity of the first user has been verified. In other examples, the server 104 may verify the identify of the first user using the authentication token 136 using any other suitable technique.

Gesture-Based Authentication Process for a Virtual Environment

Figure 4:
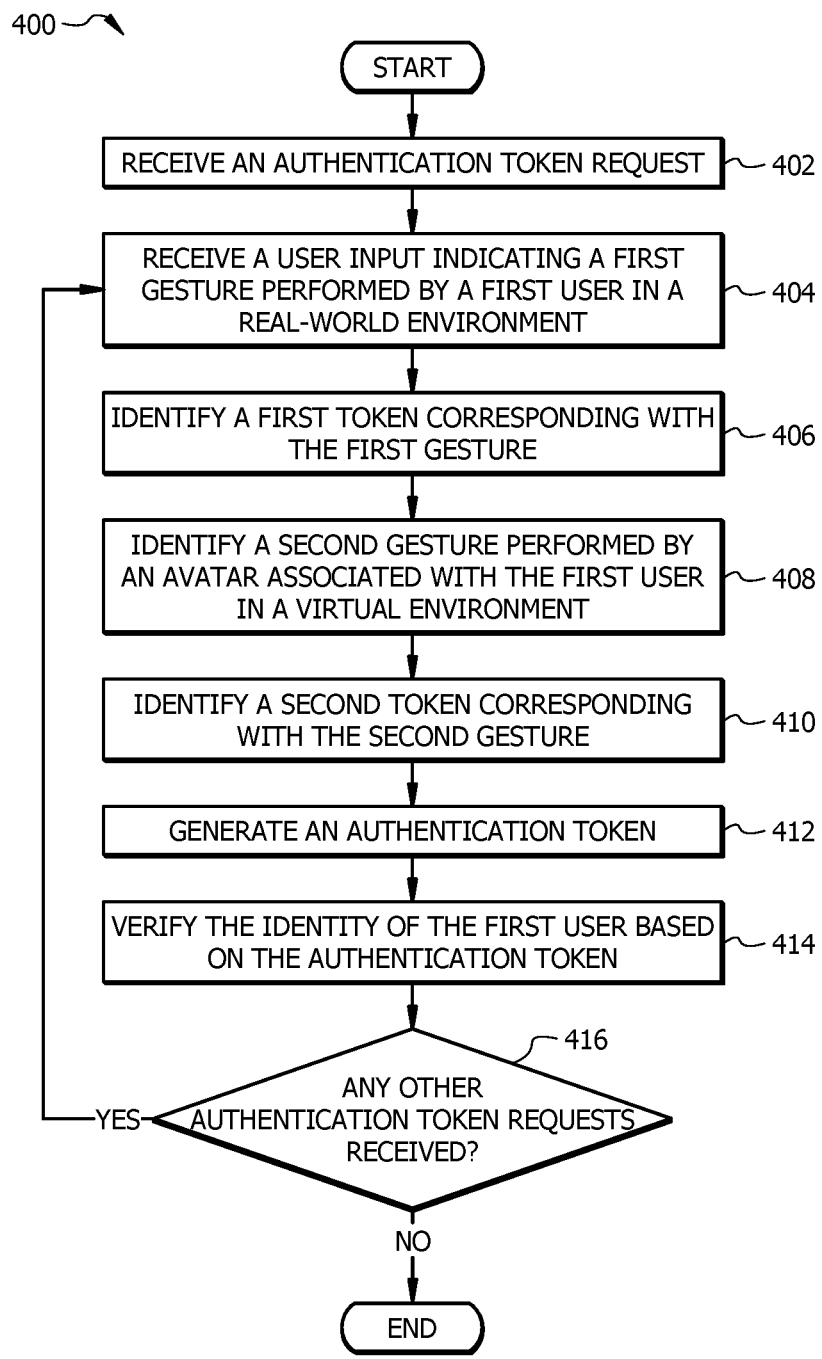
FIG. 4 is a flowchart of an embodiment of a gesture-based authentication process for a virtual environment.
Figure 5:
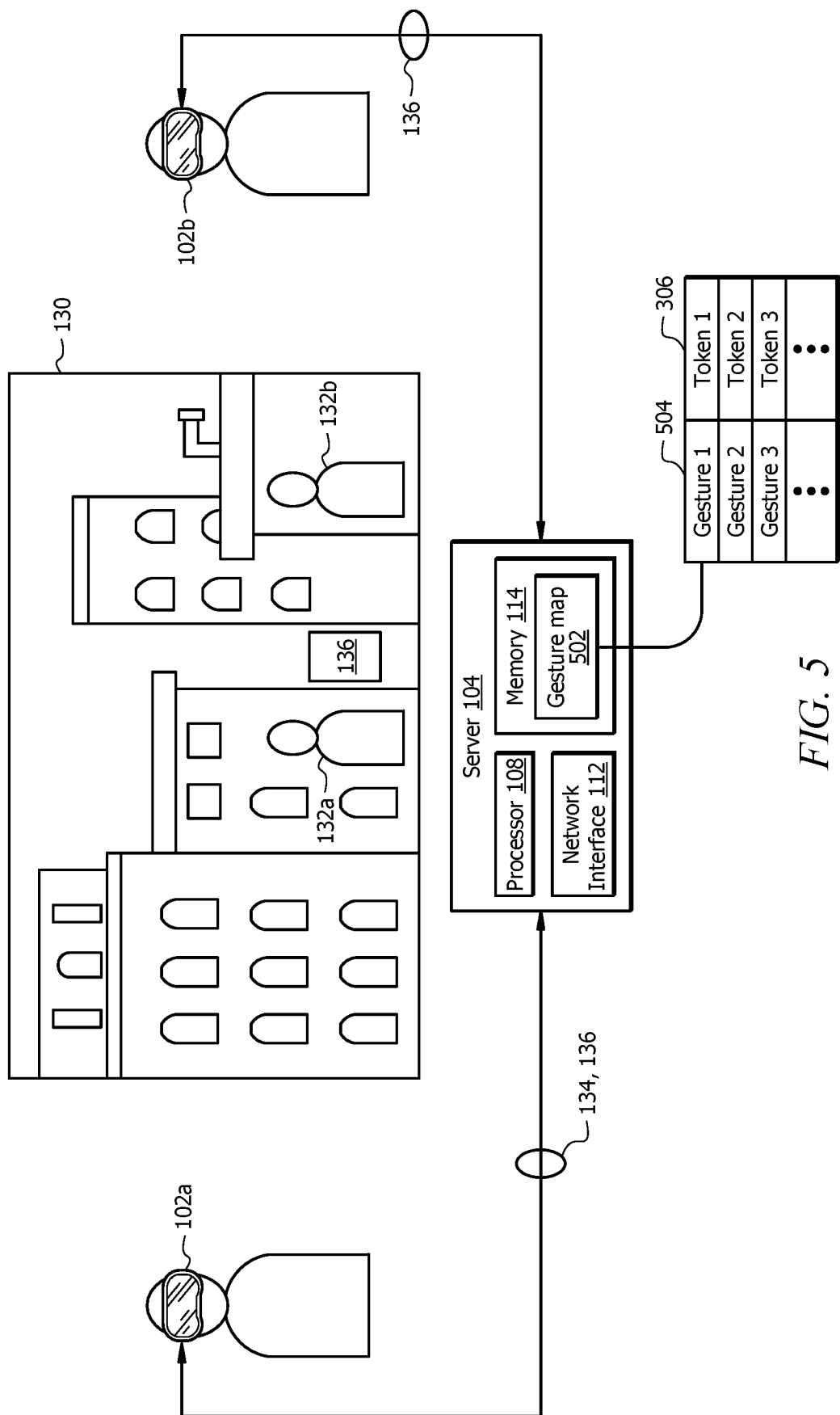
FIG. 5 is an example of users using gesture-based authentication within a virtual environment.

FIG. 4 is a flowchart of an embodiment of a gesture-based authentication process 400 for a virtual environment 130. The computer system 100 may employ process 400 to perform a gesture-based multifactor authentication that uses a combination of gestures from both the real world and a virtual environment 130. Process 400 may be employed to authenticate a user before allowing the user to perform any kind of action or interaction within a virtual environment 130. Process 400 provides improved information security because it relies on a combination of gestures that are performed by a user in the real world as well as an avatar 132 that is associated with the user in a virtual environment 130.

At operation 402, the server 104 receives an authentication request 134 for a user. Referring to the example in FIG. 5, a first user may use their avatar 132a to interact with a second user's avatar 132b. In this example, the second user may request an authentication token 136 from the first user to verify the identity of the first user and/or to authenticate the first user before interacting with the first user. In this case, the first user may use their user device 102a to generate an authentication request 134 to request an authentication token 136 for the first user. The first user may generate and send the authentication request 134 using a process similar to the process described in operation 202 of FIG. 2. After receiving the authentication request 134, the server 104 begins collecting information associated with the first user and/or their avatar 132a within the virtual environment 130 as part of a gesture-based multifactor authentication process for generating an authentication token 306.

Returning to FIG. 4 at operation 404, the server 104 receives a user input indicating a first gesture performed by a user in a real-world environment. For instance, the first user may perform a facial expression, perform a hand gesture, provide a voice command, or perform any other suitable type of gesture in the real world. The user device 102 is configured to capture any gestures performed by the first user. The user device 102 may capture the gesture using a camera, a microphone, or any other suitable type of device. After capturing the gesture that is performed by the first user, the server 104 sends a user input the server 104 that comprises or identifies a first gesture that was performed by the first user in the real world.

At operation 406, the server 104 identifies a first token 306 corresponding with the first gesture. Returning to the example in FIG. 5, the server 104 is configured to store a gesture map 502. The gesture map 502 is generally configured to map different types of gestures 504 to tokens 306. Once again, each token 306 is a unique alphanumeric value that can be used as authentication token 136 or combined with one or more other tokens 306 to form an authentication token 136. In this example, the server 104 uses the identified gesture for the first user as a search token to identify a corresponding or closest matching token 306 in the gesture map 502. In some embodiments, the gesture map 502 may be integrated with or substituted with a token map 302 as described in FIG. 3.

Returning to FIG. 4 at operation 408, the server 104 identifies a second gesture performed by an avatar 132a that is associated with the first user in a virtual environment 130. For example, the first user may trigger the avatar 132a to perform one or more specific actions (e.g. jump, crouch, wave, etc.) within a predetermined amount of time and/or to move to a predetermined location within the virtual environment 130. In this example, the server 104 monitors the first user's avatar 132a to identify any gestures performed by the first user's avatar 132a within the virtual environment 130.

At operation 410, the server 104 identifies a second token 306 corresponding with the second gesture. Here, the server 104 uses the identified gesture for the avatar 132a as a search token to identify a corresponding or closest matching token 306 in the gesture map 502.

At operation 412, the server 104 generates an authentication token 136 based on the obtained tokens 306. In one embodiment, the server 104 may generate an authentication token 136 by concatenating the obtained tokens 306 with each other to form a string of tokens 306 that corresponds with the authentication token 136. In other embodiments, the server 104 may generate an authentication token 136 by performing one or more operations on the obtained tokens 306. For example, the server 104 may perform a hashing operation on two or more of the obtained tokens 306. The result of the hashing operations may serve as the authentication token 136. In other examples, the server 104 may perform any other suitable type of operation on the obtained tokens 306 to generate an authentication token 136.

At operation 414, the server 104 verifies the identify of the first user based on the authentication token 136. In one embodiment, the server 104 may verify the identity of the first user using the authentication token 136 by sending the authentication token 136 to the user device 102a of the first user that sent the authentication request 134. In this case, the first user may use their user device 102a to provide the authentication token 136 to the second user. For example, the first user may generate a graphical representation of the authentication token 136 that can be displayed to the second user within the virtual environment 130. In this example, the graphical representation of the authentication token 136 allows the second user visually confirm the identify of the first user. For example, the second user may compare the graphical representation of the authentication token 136 to an expected or predefined graphical representation of an authentication token 136. The second user verifies the identify of the first user when the graphical representation of the authentication token 136 that is provided by the first user matches the expected or predefined graphical representation of the authentication token 136. For example, the second user may use their user device 102b to perform an image analysis on the graphical representation of the authentication token 136 that is provided by the first user and the expected or predefined graphical representation of the authentication token 136 to determine whether the two graphical representations are the same. The second user may employ any suitable type of image process algorithm or technique to compare the two graphical representations of the authentication token 136.

In other embodiments, the server 104 may verify the identity of the first user using the authentication token 136 by sending the authentication token 136 to the user device 102b of the second user. For example, the authentication request 134 may identify the second user and/or the user device 102b that is intended to receive the authentication token 136. In this case, the server 104 sends the authentication token 136 to the second user or their user device 102b to authenticate or validate the identity of the first user. For example, the second user may compare the alphanumeric string of the received authentication token 136 for the first user to an alphanumeric string of an expected or predefined authentication token 136 for the first user. The second user verifies the identify of the first user when the alphanumeric string of the received authentication token 136 for first user is the same as the alphanumeric string of the expected or predefined authentication token 136 for the first user. In some embodiments, the second user verifies the identity of the first user when the alphanumeric string of the received authentication token 136 for first user is within a predetermined threshold value of the alphanumeric string of the expected or predefined authentication token 136 for the first user.

In other embodiments, the server 104 may verify the identity of the first user by outputting a message to the second user that indicates whether the identify of the first user has been verified. For example, the server 104 may compare the alphanumeric string of the authentication token 136 for the first user to an alphanumeric string of an expected or predefined authentication token 136 for the first user. The server 104 verifies the identify of the first user when the alphanumeric string of the authentication token 136 for first user is the same as the alphanumeric string of the expected or predefined authentication token 136 for the first user. In some embodiments, the second user verifies the identify of the first user when the alphanumeric string of the received authentication token 136 for first user is within a predetermined threshold value of the alphanumeric string of the expected or predefined authentication token 136 for the first user. In response to determining that the identity of the first user has been verified, the server 104 may send a message to the user device 102b of the second user that indicates that the identity of the first user has been verified. In other examples, the server 104 may verify the identify of the first user using the authentication token 136 using any other suitable technique.

At operation 416, the server 104 determines whether any other authentication requests 134 have been received. The server 104 returns to operation 404 in response to determining that another authentication request 134 has been received. In this case, the server 104 returns to operation 402 to process another authentication request 134. Otherwise, the server 104 terminates process 400 in response to determining that no other authentication requests 134 have been received.

Resource Transfer Process for a Virtual Environment

Figure 6:
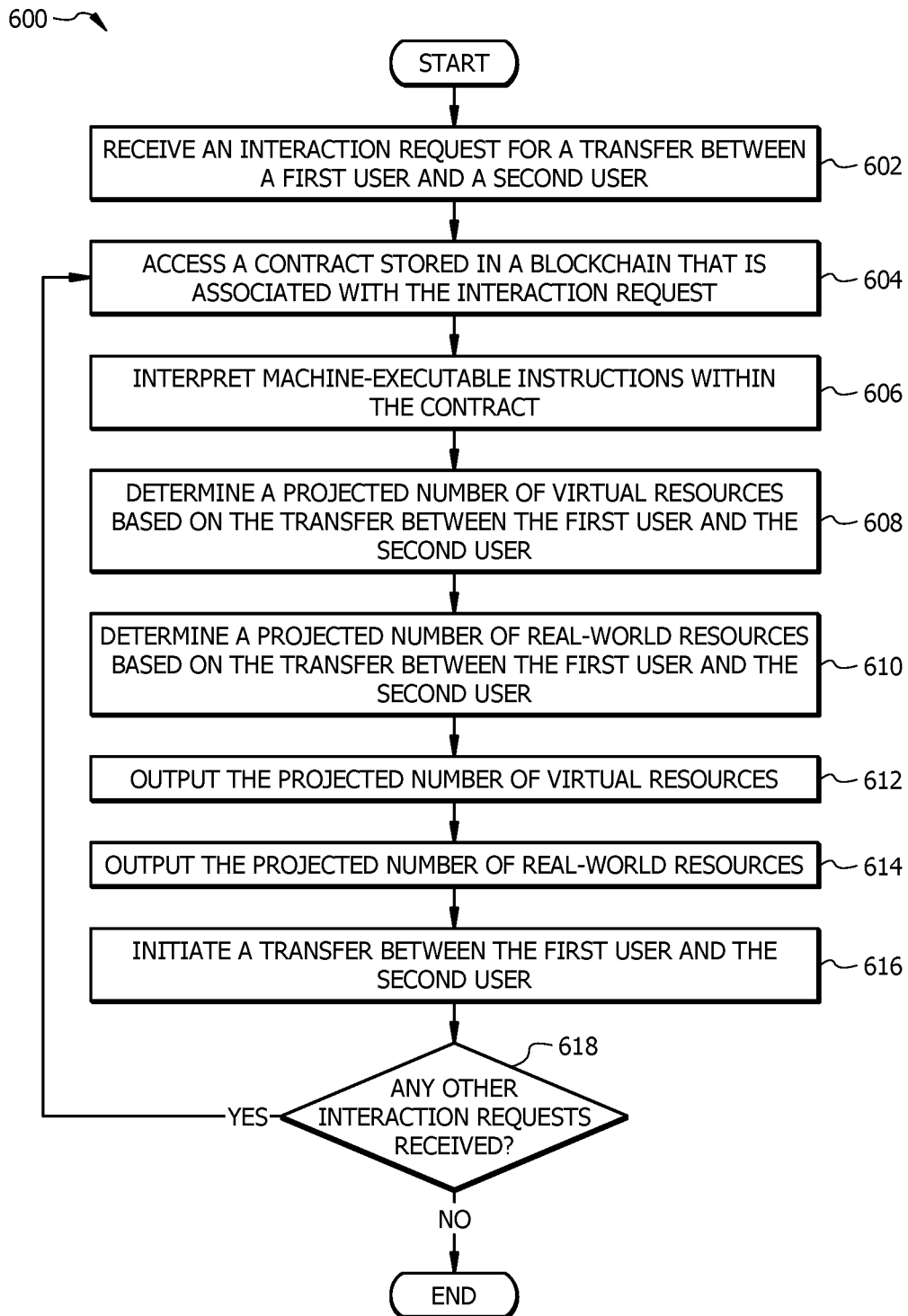
FIG. 6 is a flowchart of an embodiment of a resource transfer process for a virtual environment.
Figure 7:
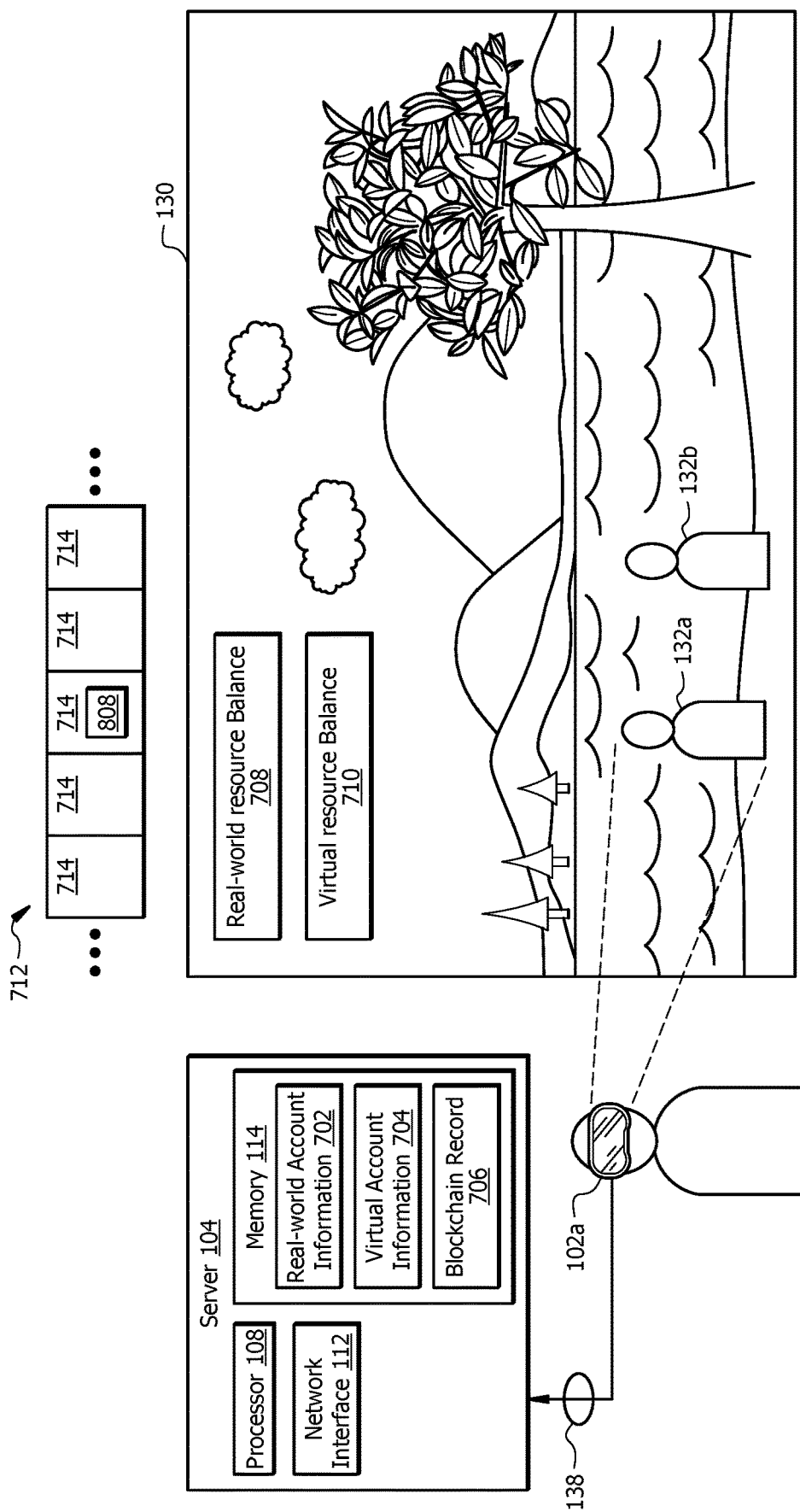
FIG. 7 is an example of a user performing a resource transfer within a virtual environment.

FIG. 6 is a flowchart of an embodiment of a resource transfer process 600 for a virtual environment 130. The computer system 100 may employ process 600 to use a contract 808 that is stored in a blockchain 712 to transfer real-world resources and/or virtual resources between users within a virtual environment 130. Process 600 also allows a user to preview the effect of a transfer of real-world resources and virtual resources by determining and outputting the projected number of real-world resources and virtual resources before initiating an actual transfer of the resources between the users.

At operation 602, the server 104 receives an interaction request 138 for a transfer between a first user and a second user. Referring to the example in FIG. 7, a first user may use their avatar 132a to interact with a second user's avatar 132b. In this example, the second user may request a transfer of real-world resources and/or virtual resources between the first user and the second user. Examples of real-world resources include, but are not limited to, physical objects, equipment, vehicles, properties, and currency. Examples of virtual resources include, but are not limited to, virtual currency, non-fungible tokens (NFTs), virtual objects, virtual equipment, virtual vehicles, virtual property, images, documents, music files, video files, and text documents. The first user may use their user device 102a to generate an interaction request 138 to request the transfer between the first user and the second user. For example, the first user may use an application within their user device 102a to generate the interaction request 138 and to send the interaction request 138 to the server 104. The user device 102a may use any suitable messaging or communication technique to transmit the interaction request 138 to the server 104. The interaction request 138 may comprise user identifiers (e.g. names, alphanumeric codes, email addresses, phone numbers, or account numbers) that identify the first user and the second user, real-world resources and/or virtual resources to be transferred between the first user and the second user, and an address for a contract 808 that is stored in a blockchain 712. The contract 808 is configured to facilitate the transfer between the first user and the second user and is described in more detail below. In other embodiments, the interaction request 138 may further comprise any other suitable type of information that is associated with the first user, the second user, and/or the real-world resources and/or virtual resources to be transferred between the first user and the second user. After receiving the interaction request 138, the server 104 begins collecting information associated with the real-world resources and/or virtual resources to be transferred between the first user and the second user and the contract 808 in the blockchain 712 that is configured to facilitate the transfer between the first user and the second user.

Figure 8:
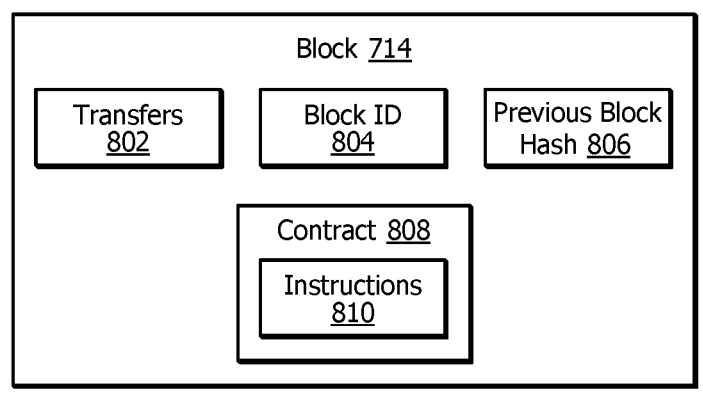
FIG. 8 is an embodiment of a block from a blockchain.

At operation 604, the server 104 accesses the contract 808 stored in a blockchain 712 that is associated with the interaction request 138. A blockchain 712 generally refers to a database shared by a plurality of devices or network nodes in a network. The computer system 100 may employ any suitable number of devices (e.g. computer or servers 104) to form a distributed network that maintains a blockchain 712. Each network node (e.g. server 104) comprises a blockchain record 706 that is configured to store a copy of the blockchain 712, which comprises blocks 714 that contain every blockchain transfer executed in the network. Referring to FIG. 8 as an example, FIG. 8 illustrates an embodiment of a block 714 from a blockchain 712. The blockchain 712 links together blocks 714 of data which comprise identifiable units called transfers 802. Transfers 802 may comprise information, files, or any other suitable type of data. For example, a transfer 802 may comprise information associated with contracts, real-world resource transfers, virtual resource transfers, personal information, or any other type of information.

Each block 714 in the blockchain 712 comprises a block identifier 804 and information derived from a preceding block 714. For example, every block 714 in the blockchain 712 includes a hash 806 of the previous block 714. By including the hash 806, the blockchain 712 comprises a chain of blocks 714 from a genesis block 714 to the current block 714. Each block 714 is guaranteed to come after the previous block 714 chronologically because the previous block's hash 806 would otherwise not be known. In one embodiment, blocks 714 in a blockchain 712 may be linked together by identifying a preceding block 714 with a cryptographic checksum (e.g. secure hash algorithm (SHA)-256) of its contents (e.g. the transfer and additional metadata) which serves as each block's unique identifier. Links are formed by storing the cryptographic checksum identifier of one block 714 in the metadata of another block 714, such that the former block 714 becomes the predecessor of the latter block 714. In this way, the blocks 714 form a chain that can be navigated from block-to-block by retrieving the cryptographic checksum of a particular block's predecessor from the particular block's own metadata. Each block 714 is computationally impractical to modify once it has been in the blockchain because every block 714 after it would also have to be regenerated. These features protect data stored in the blockchain 712 from being modified by bad actors which provides information security. When a network node creates an entry (e.g. one or more transfers 802 in a block 714) in its blockchain record 706, the blockchain 712 for all other network nodes in the distributed network is also updated with the new entry. Thus, data entered in a blockchain 712 is available and accessible to every network node with a copy of the blockchain record 706. This allows the data stored in the block 714 to be accessible for inspection and verification at any time by any device with a copy of the blockchain record 706.

Some blocks 714 comprise one or more contracts 808. The contracts 808 comprise machine-executable code, script, or instructions 810 that are configured to execute when a set of predetermined conditions have been satisfied. The contract 808 is configured to receive messages or information from other devices (e.g. a user device 102 or server 104) and to use the conditions as logical tests to determine whether or not to execute a set of instructions 810. The contract 808, instructions 810, and conditions may be written C++, C #, Go, Python, Java, extensible markup language (XML) script, or any other suitable programming language. The instructions 810 may be configured with instructions for performing any specified operations. For example, the instructions 810 may be configured to facilitate a real-world resource transfer and/or a virtual resource transfer between users. In one embodiment, the instructions 810 comprise instructions for entering a transfer in the blockchain 712 for transferring real-world resources and/or virtual resources between users' accounts. In other embodiments, the instructions 810 may comprise any other suitable type and combination of machine-executable instructions for performing other types of operations. The conditions may be configured as Boolean tests for determining whether a condition has been satisfied. Examples of conditions include, but are not limited to, range threshold values, valid time periods, approved product and service types, approved locations or areas, or any other suitable type of condition.

Returning to FIG. 6 at operation 606, the server 104 interprets machine-executable instructions within the contract 808. In one embodiment, the server 104 interprets the machine-executable instructions within the contract 808 by accessing the contract 808 at the address of the block 714 where the contract 808 is being stored in the blockchain 712. The server 104 may then extract at least a portion of the machine-executable instructions from the contract 808 by downloading or copying the machine-executable instructions from the contract 808. By extracting the machine-executable instructions from the contract 808, the server 104 is able to generate a local copy of the machine-executable instructions that can be modified and/or executed without triggering or initiating an actual transfer between the users. In some embodiments, the server 104 may translate or convert the extracted machine-executable instructions from a first format or programming language to another format or programming language. This process may further improve the server's 104 ability to modify and/or execute the machine-executable instructions.

At operation 608, the server 104 determines a projected number of virtual resources based on the transfer between the first user and the second user. Returning to the example in FIG. 7, the server 104 is configured to store virtual account information 704 that comprises information about the number of available virtual resources for each user. In one embodiment, the server 104 determines the projected number of virtual resources by first determining the number of available virtual resources for the first user using the virtual account information 704. The server 104 may then extract or identify a portion of the machine-executable instructions that are associated with transferring virtual resources and execute the portion of the machine-executable instructions using the determined number of available virtual resources for the first user. The result of executing the machine-executable instructions corresponds with the projected number of virtual resources for the first user after making a transfer between the first user and the second user.

Returning to FIG. 6 at operation 610, the server 104 determines a projected number of real-world resources based on the transfer between the first user and the second user. Returning to the example in FIG. 7, the server 104 is configured to store real-world account information 702 that comprises information about the number of available real-world resources for each user. In one embodiment, the server 104 determines the projected number of virtual resources by first determining the number of available real-world resources for the first user using the real-world account information 702. The server 104 may then extract or identify a portion of the machine-executable instructions that are associated with transferring real-world resources and then execute the portion of the machine-executable instructions using the determined number of available real-world resources for the first user. The result of executing the machine-executable instructions corresponds with the projected number of real-world resources for the first user after making a transfer between the first user and the second user.

At operation 612, the server 104 outputs the projected number of virtual resources. In one embodiment, the server 104 outputs the projected number of virtual resources by generating a graphical representation 710 within the virtual environment 130. For example, returning to the example in FIG. 7, the server 104 may display the projected number of virtual resources using a graphical representation 710 within the virtual environment 130 on the first user's user device 102a. In some embodiments, the server 104 determines and outputs the projected number of virtual resources before executing a transfer of the virtual resources between the first user and the second user.

Returning to FIG. 6 at operation 614, the server 104 outputs the projected number of real-world resources. In one embodiment, the server 104 outputs the projected number of real-world resources by generating a graphical representation 708 within the virtual environment 130. Returning to the example in FIG. 7, the first user's user device 102a may display the projected number of real-world resources using a graphical representation 708 within the virtual environment 130. In some embodiments, the server 104 determines and outputs the projected number of real-world resources before executing a transfer of the real-world resources between the first user and the second user.

Returning to FIG. 6 at operation 616, after providing a preview of the projected number of real-world resources and virtual resources, the server 104 initiates a transfer of the virtual resources and/or the real-world resources between the first user and the second user. For example, the first user may provide a user input that indicates the first user approves or authorized the transfer between the first user and the second user. In this case, the server 104 may send instructions or commands to the contract 808 to execute the contract 808 to perform a transfer of the virtual resources and/or the real-world resources between the first user and the second user.

At operation 618, the server 104 determines whether any other interaction requests 138 have been received. The server 104 returns to operation 604 in response to determining that another interaction request 138 has been received. In this case, the server 104 returns to operation 602 to process another interaction request 138. Otherwise, the server 104 terminates process 600 in response to determining that another interaction request 138 has not been received.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information security device comprising: a memory operable to store:
real-world account information associated with a first user, wherein the real-world account information identifies a number of available real-world resources; virtual account information associated with the first user, wherein the virtual account information identifies a number of available virtual resources that can be used in a virtual environment; a token map that comprises a set of tokens associated with a second elements, wherein each token from among the set of tokens is mapped to a respective element, wherein the respective element comprises a physical location in a real-world, a physical location in a virtual environment, a physical attribute associated with a user, or a gesture; and a blockchain record comprising a plurality of transfers for a blockchain; and a processor operably coupled to the memory, configured to:
receive an authentication request from the first user; identify a pixel location within the virtual environment of an avatar associated with the first user as a first authentication factor for the avatar; identify a gesture performed by the avatar as a second authentication factor for the avatar; obtain a first authentication token, from the token map, based on a first element associated with the avatar in the virtual environment, wherein the first element includes one of the pixel location of the avatar in the virtual environment or the gesture performed by the avatar associated with the first user within the virtual environment; obtain a second authentication token, from the token map, based on a second element associated with the first user in the real world, wherein the second element includes one of physical attributes information for the first user or gestures performed by the first user within the real world; and the second element is different from the first element; generate a third authentication token for the first user using the first authentication token and the authentication second token; verify an identity of the first user based at least in part upon the third authentication token; and upon verifying the identity of the first user, receive an interaction request from the first user, wherein:
the interaction request indicates a request to allow the first user to interact with a second user within the virtual environment; the interaction request comprises an address for a contract stored in the blockchain; and the contract comprises machine-executable instructions comprising: instructions for transferring real-world resources between the first user and a second user; and instructions for transferring virtual resources between the first user and the second user; access the machine-executable instructions associated with the contract; before executing the contract, determine a projected number of virtual resources for the first user based on the number of available virtual resources for the first user and the machine-executable instructions for transferring virtual resources between the first user and the second user in the contract; before executing the contract, determine a projected number of real-world resources for the first user based on the number of available real-world resources for the first user and the machine-executable instructions for transferring real-world resources for the first user and the second user in the contract; output the projected number of virtual resources to the first user;
output the projected number of real-world resources to the first user; and send instructions to the contract, wherein sending the instructions to the contract: initiates a transfer of the real-world resources between the first user and the second user; and initiates a transfer of the virtual resources between the first user and the second user.

2. The device of claim 1, wherein the processor is further configured to convert the machine-executable instructions associated with the contract from a first programming language to a second programming language.

3. The device of claim 1, wherein the processor is further configured to store a copy of at least a portion of the machine-executable instructions associated with the contract in the memory.

4. The device of claim 1, wherein determining the projected number of real-world resources for the first user comprises: extracting a portion of the machine-executable instructions associated with transferring real-world resources; and executing the extracted portion of the machine-executable instructions associated with the contract.

5. The device of claim 1, wherein determining the projected number of virtual resources for the first user comprises: extracting a portion of the machine-executable instructions associated with transferring virtual resources; and executing the extracted portion of the machine-executable instructions associated with the contract.

6. The device of claim 1, wherein outputting the projected number of virtual resources to the first user comprises displaying the projected number of virtual resources on a user device associated with the first user.

7. The device of claim 1, wherein outputting the projected number of real-world resources to the first user comprises displaying the projected number of real-world resources on a user device associated with the first user.

8. A resource transfer method, comprising: receiving by a processor an authentication request from the first user; identifying by the processor a pixel location within the virtual environment of an avatar associated with the first user as a first authentication factor for the avatar; identifying by the processor a gesture performed by the avatar as a second authentication factor for the avatar; obtaining a first authentication token, from a token map, based on a first element associated with the avatar in the virtual environment, wherein the first element includes one of the pixel location of the avatar in the virtual environment or the gesture performed by the avatar associated with the first user within the virtual environment, wherein the token map comprises a set of tokens associated with a set of elements, wherein each token from among the set of tokens is mapped to a respective element,
wherein the respective element comprises a physical location in a real-world, a physical location in a virtual environment, a physical attribute associated with a user, or gestures; obtaining a second authentication token, from the token map, based on a second element associated with the first user in the real-world, wherein the second element includes one of physical attributes information for the first user or gestures performed by the first user within the real world; generating a third authentication token for the first user using the first authentication token and the second authentication token; verifying an identity of the first user based at least in part upon the third authentication token; and upon verifying the identity of the first user, receiving an interaction request from a first user, wherein: the interaction request indicates a request to allow the first user to interact with a second user within the virtual environment; the interaction request comprises an address for a contract stored in a blockchain; and the contract comprises machine-executable instructions comprising:
  instructions for transferring real-world resources between the first user and a second user; and
  instructions for transferring virtual resources between the first user and the second user;
  accessing the machine-executable instructions associated with the contract; before executing the contract, determining a projected number of virtual resources for the first user based on a number of available virtual resources for the first user and the machine-executable instructions for transferring virtual resources between the first user and the second user in the contract;
  before executing the contract, determining a projected number of real-world resources for the first user based on a number of available real-world resources for the first user and the machine-executable instructions for transferring real-world resources for the first user and the second user in the contract; outputting the projected number of virtual resources to the first user; outputting the projected number of real-world resources to the first user; and sending instructions to the contract, wherein sending instructions to the contract: initiates a transfer of the real-world resources between the first user and the second user; and initiates a transfer of the virtual resources between the first user and the second user.

9. The method of claim 8, further comprising sending instructions to convert the machine-executable instructions associated with the contract from a first programming language to a second programming language.

10. The method of claim 8, further comprising sending instructions to store a copy of at least a portion of the machine-executable instructions associated with the contract in a memory.

11. The method of claim 8, wherein determining the projected number of real-world resources for the first user comprises: extracting a portion of the machine-executable instructions associated with transferring real-world resources; and executing the extracted portion of the machine-executable instructions associated with the contract.

12. The method of claim 8, wherein determining the projected number of virtual resources for the first user comprises: extracting a portion of the machine-executable instructions associated with transferring virtual resources; and executing the extracted portion of the machine-executable instructions associated with the contract.

13. The method of claim 8, wherein outputting the projected number of virtual resources to the first user comprises displaying the projected number of virtual resources on a user device associated with the first user.

14. The method of claim 8, wherein outputting the projected number of real-world resources to the first user comprises displaying the projected number of real-world resources on a user device associated with the first user.

15. A non-transitory computer-readable medium storing instructions that when executed by a processor cause the processor to: receive an authentication request from the first user; identify a pixel location within the virtual environment of an avatar associated with the first user as a first authentication factor for the avatar; identify a gesture performed by the avatar as a second authentication factor for the avatar; obtain a first authentication token, from a token map, based on a first element associated with the avatar in the virtual environment, wherein the first element includes one of the pixel location of the avatar in the virtual environment the gesture performed by the first user within the real world or gestures performed by the avatar associated with the first user within the virtual environment, wherein the token map comprises a set of tokens associated with a set of elements, wherein each token from among the set of tokens is mapped to a respective element, wherein the respective element comprises a physical location in areal-world, a physical location in a virtual environment, a physical attribute associated with a user, or gestures; obtain a second authentication token, from the token map, based on a second element associated with the first user in the real-world, wherein the second element includes one of the physical attributes information for the first user or gestures performed by the first user within the real world; generate a third authentication token for the first user using the first authentication token and the second authentication token; identity of the first user based at least in part upon the third authentication token; and upon verifying the identity of the first user, receive an interaction request from a first user, wherein:
  the interaction request indicates a request to allow the first user to interact with a second user within the virtual environment; the interaction request comprises an address for a contract stored in a blockchain; and the contract comprises machine-executable instructions comprising:
  instructions for transferring real-world resources between the first user and a second user; and
  instructions for transferring virtual resources between the first user and the second user; access the machine-executable instructions associated with the contract; before executing the contract, determine a projected number of virtual resources for the first user based on a number of available virtual resources for the first user and the machine-executable instructions for transferring virtual resources between the first user and the second user in the contract; before executing the contract, determine a projected number of real-world resources for the first user based on a number of available real-world resources for the first user and the machine-executable instructions for transferring real-world resources for the first user and the second user in the contract; output the projected number of virtual resources to the first user; output the projected number of real-world resources to the first user; and send instructions to the contract, wherein sending the instructions to the contract: initiates a transfer of the real-world resources between the first user and the second user; and initiates a transfer of the virtual resources between the first user and the second user.

16. The non-transitory computer-readable medium-of claim 15, wherein the instructions further cause the processor to convert the machine-executable instructions associated with the contract from a first programming language to a second programming language.

17. The non-transitory computer-readable medium-of claim 15, wherein the instructions further cause the processor to store a copy of at least a portion of the machine-executable instructions associated with the contract in a memory.

18. The non-transitory computer-readable medium-of claim 15, wherein determining the projected number of real-world resources for the first user comprises: extracting a portion of the machine-executable instructions associated with transferring real-world resources; and executing the extracted portion of the machine-executable instructions associated with the contract.

19. The non-transitory computer-readable medium-of claim 15, wherein determining the projected number of virtual resources for the first user comprises: extracting a portion of the machine-executable instructions associated with transferring virtual resources;

and executing the extracted portion of the machine-executable instructions associated with the contract.

20. The non-transitory computer-readable medium-of claim 15, wherein:

outputting the projected number of virtual resources to the first user comprises displaying the projected number of virtual resources on a user device associated with the first user; and outputting the projected number of real-world resources to the first user comprises displaying the projected number of real-world resources on a user device associated with the first user.

\* \* \* \* \*